United States Patent
Campbell

[15] 3,689,982
[45] Sept. 12, 1972

[54] APPARATUS AND METHOD FOR CABLE COVERING

[72] Inventor: Ian Wallace Campbell, 2750 Tudor Ave, Victoria, British Columbia Canada

[22] Filed: Oct. 27, 1970

[21] Appl. No.: 84,352

[52] U.S. Cl. ............29/430, 29/202.5, 29/241, 29/433
[51] Int. Cl. ...............B23p 19/00, B23p 19/04
[58] Field of Search............29/430, 433, 202.5, 241

[56] References Cited

UNITED STATES PATENTS 2,876,534   3/1959   Savona ................29/241 X
3,332,138   7/1967   Garner .................29/430

*Primary Examiner*—Thomas H. Eager
*Attorney*—John E. Prothroe

[57] ABSTRACT

Apparatus and method for covering cables with flexible thin-walled tubing for sliding fit, for use in such applications as pre-tensioning or post-tensioning concrete installations. The cable is coated with lubricant, and fed into a length of extended tubing from a nozzle to which the tubing is secured.

6 Claims, 5 Drawing Figures

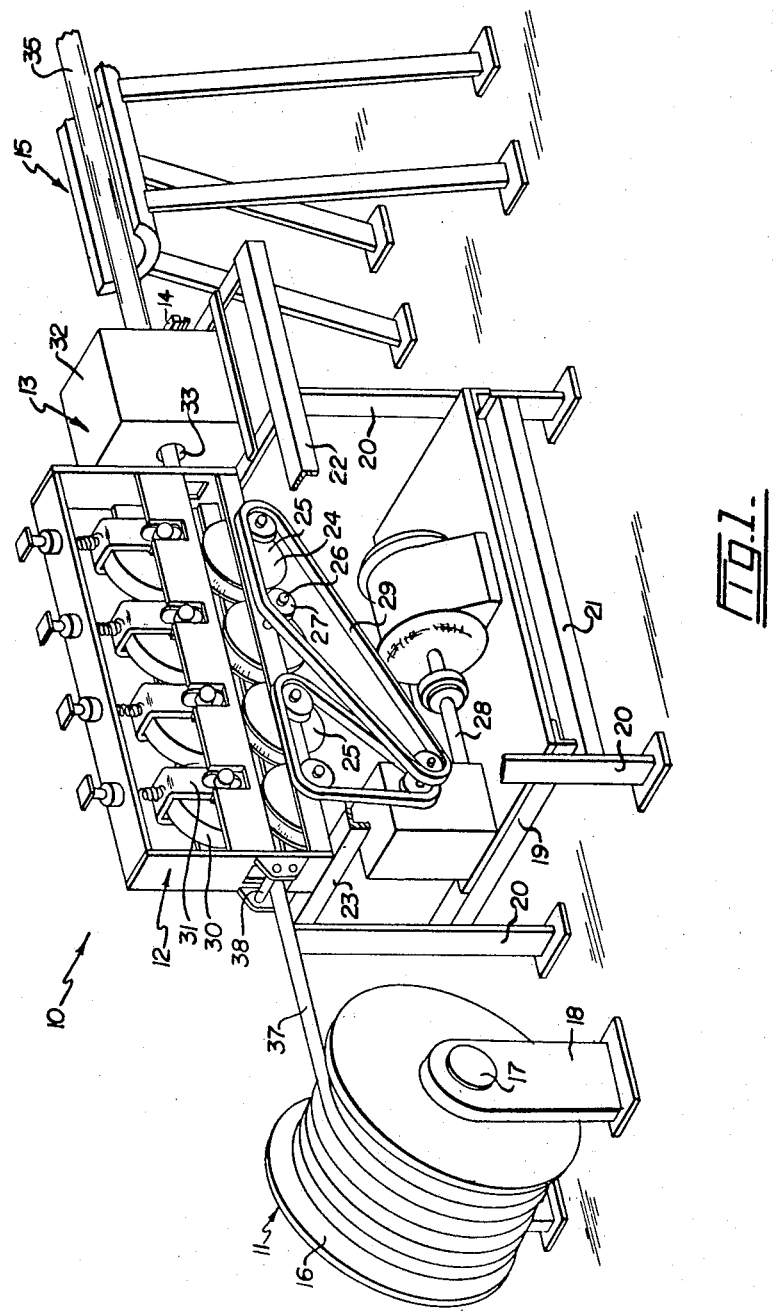

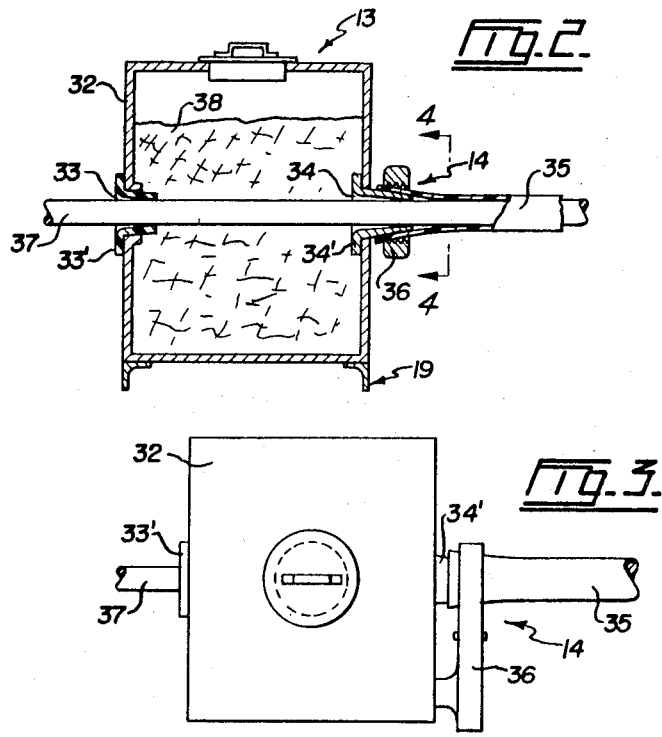
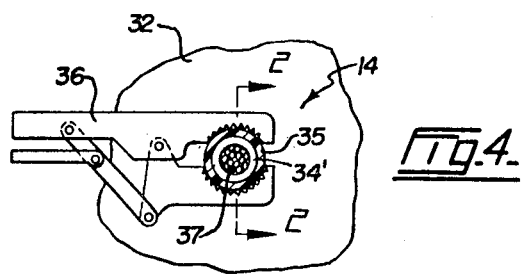
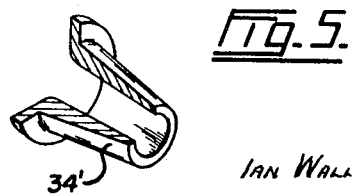
IAN WALLACE CAMPBELL
*INVENTOR.*
BY

APPARATUS AND METHOD FOR CABLE COVERING

This invention relates to an improved method and apparatus for covering cables, and more specifically relates to a method and apparatus for covering multi-strand cables with a seamless flexible thin-walled tubing, where a sliding fit is desirable between the cable and the tubing.

Conventional means for manufacturing covered cable consist of either wrapping the cable in a flexible strip covering, wound spirally on the cable, or alternatively, enclosing the cable in a thin, flexible-walled sheath having a longitudinal seam, which is progressively closed as the cable advances through sealing apparatus.

Such method and apparatus as has been heretofore used produces a close contact between the cable and the covering, so that relative movement of the cable within the covering is difficult or impossible in long lengths of covered cable. Accordingly, where relative movement of the cable within the covering is desirable, such method and apparatus as is hereinabove described has proven unsatisfactory.

Relative movement of the cable within the covering is desirable in many applications. For example, in prestressed concrete structural members, where internal compressive forces are induced in the structural member prior to external loading, such internal compressive forces are normally induced by tension loading of longitudinal steel tension rods or cables positioned within the structural member on the compression side of the neutral axis. Such tension prestressing can be accomplished by either pre-tensioning or post-tensioning the longitudinal bars or cables.

Pre-tensioning lends itself only to members that can be precast and readily transported and precludes the advantages of monolithic cast-in-place construction. Post-tensioning, on the other hand, lends itself well to monolithic cast-in-place construction.

Post-tensioning consists of imbedding high tensile strength cable, protected by thin-walled covering within which the cable may move, in the concrete. After the concrete is cast and has reached sufficient strength, the cable is stressed in tension, normally by means of hydraulic jacks, and then anchored with non-slip end anchorages secured in the edges or ends of the concrete member.

The cable must be free to move within the covering, otherwise uniform tension will not be developed throughout the length of the tension member.

In normal post-tensioning practise, the tension member comprises a seven wire cable of high carbon steel, forming a one-half inch diameter cable having an ultimate strength of approximately 270,000 pounds per square inch. The cables are coated with a rust-inhibiting, low-viscosity grease, and then encased in flexible polyethylene tubing having a wall thickness of approximately ten mils and an internal diameter of approximately five-eighths of an inch.

It is an object therefore, of this invention, to provide an improved method and apparatus for continuously forming a multiple-strand cable, clad in a seamless flexible covering, wherein the cable constitutes a loose sliding fit within the covering.

Another object of the invention is the provision of automatic apparatus for forming a multiple-strand covered cable having a loose sheath fit and including means for dispensing a lubricant for application upon the cable immediately prior to the introduction of the cable into the covering.

These and other advantages will become apparent through the consideration of the following detailed description taken in conjunction with the attached drawings to which they relate.

The apparatus invention consists broadly of the provision of an apparatus comprising storage means for a supply of cable, means for withdrawing said cable from storage, means for coating the cable with a suitable lubricant, means for feeding the cable into a preformed seamless tube, and means for severing the covered cable so formed into convenient lengths.

The method invention in broad aspect comprises a method of covering flexible cable with tubular cable covering comprising the steps of coating the cable with a suitable lubricant, and feeding said cable into the case of a suitable cable covering having an internal diameter slightly in excess of the external diameter of said cable.

One embodiment of the apparatus of the invention consists of the arrangement and construction of parts all as hereinafter more particularly described, reference being had to the accompanying drawings in which:

FIG. 1 is a general perspective view of the apparatus embodying the present invention;

FIG. 2 is a longitudinal cross-sectional view through the cable lubricating unit and the cable covering assembly;

FIG. 3 is the top plan view of the cable covering assembly;

FIG. 4 is an end elevational view of the cable covering assembly taken along the line 4—4 of FIG. 2;

FIG. 5 is a detail of the cable feeding nozzle.

In the drawings, like characters of reference indicate corresponding parts in the several figures.

Proceeding, therefore, to describe the invention in detail and referring to the accompanying drawings, in FIG. 1 a cable covering apparatus designated generally 10 will be understood to comprise a cable storage assembly 11, a cable transfer assembly 12, a cable lubricating assembly 13, a cable covering assembly 14, and a cable covering trough assembly 15. These various major assemblies are maintained in general alignment with one another on a common supporting floor. The cable storage assembly 11 comprises desirably a spool or drum 16, supported axially horizontally by means of the shaft 17, supported for journalled rotation in the support members 18 as is clearly depicted in FIG. 1.

The cable transfer assembly 12 consists of a supporting framework generally designated 19, comprising the floor-engaging legs 20, a pair of intermediate longitudinal support members 21, a plurality of upper longitudinal support members 22 and an upper transverse support member 23. The framework may be conveniently constructed of steel angle members, desirably welded together at their connections.

A train of roller guides, mounted in two mutually vertically disposed sets, and cooperating to receive and advance the cable from the covering storage assembly, is positioned within the supporting framework 19. The lower set of roller guides 24 comprises a plurality of identical sheaves 25, each having a half-round peripheral groove therein, mounted for horizontal axial rotation in mutual longitudinal alignment as depicted in FIG. 1. Each of the sheaves 25 is supported on a horizontal shaft 26, keyed to a sprocket 27. An electric motor drive 28, and chain assembly generally designated 29 engages the sprockets 27 in a positive drive, each of the sheaves 25 rotating with the same peripheral velocity.

The upper set of roller guides 30 comprises a like number of sheaves, journally mounted immediately above and in alignment with the set of driving roller guides 24, as depicted in FIG. 1. These guides are adapted for idler rotation from contact with the cable and the driven guides 24, and are designed to receive and maintain contact between the cable supply and the driving roller guides 24.

Each of the idler guides 30 is journalled for rotation in spring mounted bearings 31, biased downwardly, thereby maintaining pressure contact of the cable supply against the driving guides 25.

The cable lubricating assembly 13 essentially comprises a lubricant storage tank 32, mounted in general alignment with the cable feeding assembly 12 upon the support framework 19, and being adapted to receive the cable after it has passed between the roller guides 24 and 30. A cable inlet opening 33 and a cable outlet opening 34, with nozzle inserts 33' and 34' respectively, each in axial alignment with the roller guides 24 and 30 provide entry and exit means to and from the cable lubricating unit 13. The nozzle inserts are desirably removable for replacement after wear; nozzle insert 33' is constructed preferably of relatively resilient plastic such as nylon, while nozzle 34' is constructed preferably of a wear-resistant metal such as ni-chrome steel.

The cable covering assembly generally designated 14, comprises the cable feeding nozzle 34', adapted to receive in overlaying fashion the butt end of the cable cover 35 as a sliding fit and suitable clamping means such as the hand-operated clamp 36, mounted on the framework support 19, permitting the butt end of the cable cover 35 to be securely held on the cable feeding nozzle 34' during the operation of the apparatus, and subsequent rapid release.

The cable cover trough assembly 15 mounted adjacent and in general axial alignment with the cable feeding assembly 12, supports initially a length of cable cover 35 in extended fashion as depicted in FIG. 1, and at the conclusion of the operation supports the lengthy covered cable.

In operation, the free end of the cable 37 is uncoiled from the cable storage assembly 11, and fed into the cable feeding assembly 12 from the entry roller guide 38, and is threaded between the adjacent pairs of roller guides 24 and 30. The free end of the cable is delivered by the driving guides 25 through the cable entry opening 33 into the cable lubricating unit 13, where it is passed through and acquires a coating of suitable lubricating grease 38. The free end of the cable 37 is then directed to the cable feeding nozzle 34' and the butt end of the cable cover 35 is positioned over the cable feeding nozzle 34' where it is secured by means of the cable cover clamp 36. Operation of the motor driven guide trains 25, through friction contact with the cable 37, forces the cable upon discharge through the bore of the cable cover 35, and outwardly into the cable trough assembly 15. When a satisfactory length of covered cable has been produced, the operation is discontinued, and the covered cable is severed adjacent the nozzle 14, by any convenient cutting means such as shears or cutting torch (not illustrated).

Since various modifications can be made to the invention herein described within the scope of the inventive concept disclosed, it is not intended that protection of the said invention should be interpreted as restricted to the particular modifications or known parts of such concept as particularly described, defined or exemplified, since this disclosure is intended to explain the construction and operation of such concept and is not for the purpose of limiting protection to any specific embodiment or detail thereof.

What I claim as my invention is:

1. Apparatus for cable covering for use with flexible cable and tubular cable covering comprising, in combination: cable storage means; a cable transfer assembly; cable lubricating means; a cable feeding nozzle; means for securing an end of said cable covering to said nozzle; and means to support said tubular cable covering in substantially extended condition for passage therethrough of said flexible cable upon discharge thereof from said cable feeding nozzle.

2. Apparatus according to claim 1 wherein said cable transfer assembly comprises a plurality of rotating roller guides in mutually opposed relationship and a power source driving at least one of said roller guides.

3. Apparatus for cable covering for use with flexible cable and tubular cable covering comprising, in combination; cable storage means; a plurality of roller guides in opposed paired arrangement; at least one of the adjacent members of each of the said pairs being inwardly spring biased; a power source driving at least one of said roller guides; cable lubricating means comprising a lubricating tank mounted adjacent to said roller guides; an inlet nozzle mounted upon one wall of said lubricating tank and a cable feeding nozzle mounted upon the opposite wall of said lubricating tank, each of said nozzles being in axial alignment with said roller guides and being adapted respectively to introduce and discharge flexible cable from said lubricating tank; means for securing an end of said tubular cable covering to said discharge nozzle; and means to support said tubular cable covering in substantially extended condition for passage therethrough of said flexible cable upon discharge thereof from said discharge nozzle.

4. Apparatus for cable covering for use with flexible cable and tubular cable covering comprising, in combination: cable storage means; cable transfer means comprising a plurality of roller guides in opposed paired arrangement, at least one of the adjacent members of each of said pairs being inwardly spring biased; a framework for supporting said roller guides; a power source driving at least one of said roller guides; cable lubricating means comprising a lubricating tank mounted adjacent to said roller guides; an inlet nozzle mounted upon said lubricating tank and a discharge nozzle mounted upon said lubricating tank opposite said inlet nozzle, each of said nozzles being in axial alignment with said roller guides and being adapted respectively to introduce and discharge flexible cable into and from said lubricating tank; means for securing an end of said tubular cable covering to said discharge nozzle; and means to support said tubular cable covering in substantially extended condition for passage therethrough of said flexible cable upon discharge thereof from said discharge nozzle.

5. Apparatus for cable covering for use with flexible cable and tubular cable covering comprising in combination: cable storage means; a rectilinear ground-engaging framework; cable transfer means comprising a plurality of roller guides in opposed paired arrangement mounted for rotation upon said framework, at least one of the adjacent members of each of said pairs of roller guides being inwardly spring-biased; a power source driving at least one of said roller guides; cable lubricating means comprising a lubricating tank mounted adjacent to said roller guides; and inlet nozzle mounted upon said lubricating tank and a discharge nozzle mounted upon said lubricating tank opposite said inlet nozzle, each of said nozzles being in axial alignment with said roller guides and being adapted respectively to introduce and discharge flexible cable from said lubricating tank; means for securing an end of said tubular cable covering to said discharge nozzle; and means to support said tubular cable covering in substantially extended condition for passage therethrough of said flexible cable upon discharge thereof from said discharge nozzle.

6. The method of covering flexible cable with tubular cable covering comprising the steps of: providing a length of flexible cable and a length of tubular cable covering having an internal bore of a diameter slightly in excess of the external diameter of said flexible cable and having a length at least substantially equivalent to the length of said cable; coating said cable with a suitable lubricant; securing an end of said tubular cable covering and introducing said cable with said associated lubricant coating into the internal bore of said tubular cable covering so that said cable is substantially fully covered by said cable covering.

* * * * *